Figure 1:
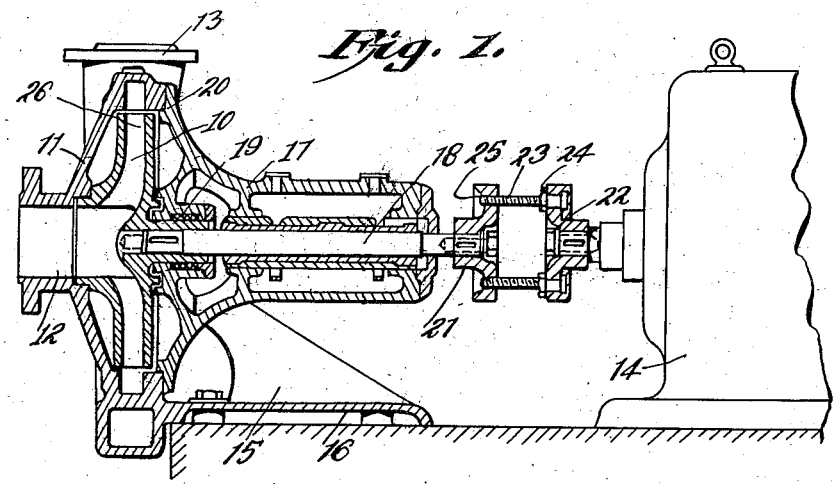

March 5, 1929.  F. LAWACZECK  1,704,481

ROTARY MACHINE, PARTICULARY IN CENTRIFUGAL PUMP

Filed Aug. 17, 1926

Franz Lawaczeck
INVENTOR
BY
ATTORNEY

Patented Mar. 5, 1929.

1,704,481

UNITED STATES PATENT OFFICE.

FRANZ LAWACZECK, OF MUNICH, GERMANY, ASSIGNOR TO WORTHINGTON PUMP AND MACHINERY CORPORATION, OF NEW YORK, N. Y., A CORPORATION OF VIRGINIA.

ROTARY MACHINE, PARTICULARLY IN CENTRIFUGAL PUMP.

Application filed August 17, 1926. Serial No. 129,678.

The casings of rotary machines and in particular those of centrifugal pumps are always so manufactured that after the entire plant has been finally erected in place the rotating parts may be taken out in a simple manner and, just as the bearings of the shaft, may be inspected. For this purpose it is desirable that the pipes leading to the pump or the like do not need to be loosened when the rotary parts are taken out.

To this end, the pump casings are at the present time usually divided on the middle horizontal plane, the pipe-connectors which supply and deliver the water being joined to the lower half of the casing which is fixed to the foundation. The upper or cover portion of the pump can be taken off so that the movable parts of the pump are accessible without its being necessary, while the rotor of the pump is taken out, to loosen the connections to the piping or to remove from its place the machine for driving the pump.

Drawbacks of this construction are, however, that the weight of, and especially the work of manufacturing the machine are considerably augmented owing to the flanges which extend horizontally around the machine. Moreover it is not simple and convenient to unite the packing glands to the horizontally divided casing. Furthermore the working of the plant is much inconvenienced by the large and complicated packing face between the flanges of the casing, since said face requires very careful attention if it is to remain continually tight.

These drawbacks would certainly be avoidable if the machine-casing were divided in known manner circumferentially (i. e. round its periphery) instead of on a horizontal plane, but this construction has the great drawback that the rotor is accessible only after the difficult and tedious operation of taking the machine-set to pieces.

Now the present invention provides, even when the machine-casing is circumferentially divided, a method of dismantling the rotor as well as the packing gland and shaft-bearing at least quite as readily and simply as in the case of the usual horizontally-divided machine-casings. This is attained by providing at the connection between the shaft of the driving machine and the rotor one or more removable members which afford a space for axial play, so that the rotor, together with its bearing which is circumferentially flanged at the pump casing, may be withdrawn axially from said pump-casing sufficiently far to render the rotor and bearing accessible. For instance, the half-coupling of the pump-shaft may be spaced a certain distance from the half-coupling of the driving machine, and between the two half-couplings there may be provided removable transmission means, possibly bolted-in pins or the like, which are of such length that after their removal sufficient space for axial play remains between the half-couplings in order to remove the rotor together with its bearing from the pump-casing. With this arrangement it is preferred that there be connected to the foundation, not that part of the casing which contains the bearing of the rotor, but that part thereof which contains the pipe connectors and the spiral chamber, the diffuser or the like.

Figure 2:
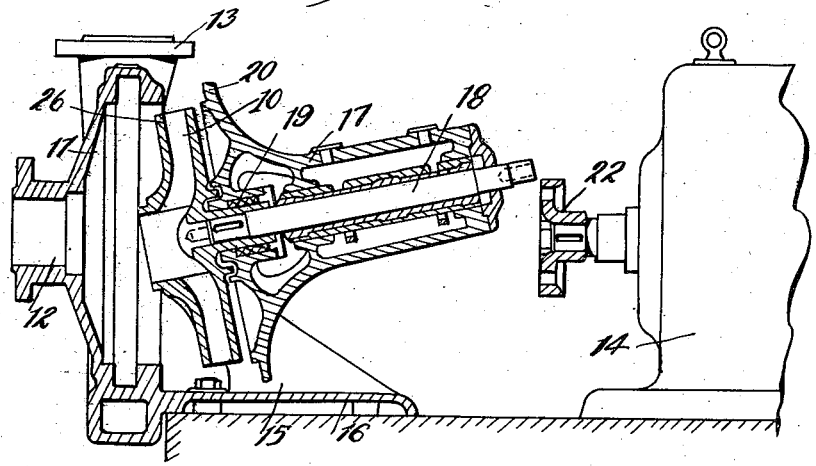

One of the numerous possible embodiments of the present invention is illustrated by way of example in the accompanying drawing which refers to two different operations and in which Fig. 1 shows in vertical axial section a rotary pump including the coupling between its shaft and that of the driving motor, and Fig. 2 shows in similar section the same pump while the rotor and its bearing are being taken out.

In this example, which refers to a normal single-stage rotary pump, the rotor 10 of the latter is mounted in a casing 11 having a suction-pipe connector 12 and a pressure-pipe connector 13. As is clear from the drawing it is not essential in this case to join the two pipe-connectors 12 and 13 to the lower portion of the casing. They may on the contrary, be joined in desired manner, for instance, the suction-pipe connector 12 may be central and the pressure-pipe connector be directed upwards, whereby the guidance of the water is on the whole facilitated.

The said casing 11 is connected to the foundation plate of the driving motor 14 by means of a strong pedestal 15 extending in the direction of said driving-motor or is connected directly to the foundation of the machine by means of a foundation-plate 16 of its own. The bearing 17 of the pump, in which the shaft 18 connected to the rotor 10 rests and which contains the packing-gland 19, is set against the said casing 11 by the aid of a circumferential flange 20 and is connected thereto by means of bolts or in other suitable manner. That end of the shaft 18 which extends from the bearing 17 carries a half-coupling 21 in the usual manner. Opposite to the latter but spaced at a sufficient axial distance therefrom is arranged the corresponding half-coupling 22 of the shaft of the driving motor 14. In the example shown, both half-couplings 21 and 22 are connected together by means of long bolted-in pins 23, which are secured to the half-coupling 22 of the motor by means, for instance, of nuts 24, and the long stems of said bolted-in pins engage through holes 25 in the half-coupling 21 of the pump-shaft 18. In this or other desired manner the bolted-in pins may be readily taken out.

It is essential that, by the removal of the bolted-in pins 23 or any other members provided between the rotor and the driving machine, there be formed a space for axial play of such dimensions that, after the members for connecting the flange 20 have been set free, the bearing-member 17 together with the parts connected to it, i. e. in most cases the shaft 18 and the rotor 10, may be shifted axially towards the driving motor 14 through such a distance that the circumferential edge 26 of the rotor 10 which is located farthest inwards and at the greatest diameter may come freely out of the casing 11 in consequence of this axial displacement.

In the example illustrated wherein it has been assumed that when dismounting occurs the half-coupling 21 is taken off the shaft 18, there is accordingly provided a space for axial play at the place of coupling at least as large as that dimension of the pump-casing which extends from the edge 26 of the rotor 10 as far as the place at which the inside diameter of the casing 11 passes into a substantially larger diameter (for instance into a face for a closing flange).

The dismounting is effected in the following manner:—

After the removal of the members which provide the space for axial play, therefore in the example after the removal of the coupling pins 23 between the pump and the driving machine 14 (and, if necessary, also after the removal of the half-coupling 21 or 22 itself) the screws which secure the flange 20 of the bearing-member 7 are undone. Thereupon the bearing-member 17 together with the pump shaft 18 and the rotor 10 are drawn in the axial direction towards the driving machine 14 until the rotor 10 at its edge 26 of largest diameter extends freely out of the pump casing.

In this position, which Fig. 2 represents, the bearing-member together with the free end of the shaft may be raised and canted so that it together with the rotor may be withdrawn from the space between the pump casing 11 and the driving machine 14. The re-assembling or insertion of these parts may be effected in correspondingly reverse order.

The invention is not limited to the embodiment precisely described above. It is possible for example for the shaft 18 to be divided, and the intermediate member to be carried in a separate bearing which is screwed on or otherwise connected either to the foundation directly or to the pump bearing, so that it is removable for dismounting the rotor. Constructional modifications of this kind are capable of execution in great numbers, all of which permit the same mode of dismounting a rotary pump or the like, and principally bring about the essential advantage, that, with the simplest formation of the packing places of the pump-casing, the pump-rotor and its bearing may be dismounted without its being necessary for the pump-casing and its piping and the driving machine to be removed from their places, this dismounting being rendered possible by the members to be dismounted being first of all moved axially into the space between the pump-casing and the driving motor until they become free from the pump-casing.

I claim:—

1. The combination, with a prime mover, of a rotating pump comprising an anchored casing section, a movable casing section detachably attached to said anchored casing section and movable longitudinally of the axis of the pump, said movable section carrying the pump impeller and driving shaft, and a coupling connecting the driving shaft and prime mover, said coupling constructed to permit, upon disconnection of coupling parts, movement of the movable casing section, longitudinally of the axis of the pump a distance equal to or greater than the depth of insertion of the impeller into the anchored section.

2. The combination, with a prime mover, of a rotating pump comprising an anchored casing section, a movable casing section detachably attached to said anchored casing section and movable longitudinally of the axis of the pump, said movable section carrying the pump impeller and driving shaft, and a coupling connecting the driving shaft and prime mover, said coupling constructed to permit, upon disconnection of coupling parts, movement of the movable casing section, longitudinally of the axis of the pump a distance equal to or greater than the depth of insertion of the impeller into the anchored section, said anchored casing section having suction and discharge connections formed thereon.

3. A combination, with a prime mover, of a rotating pump comprising an anchored casing section, a movable casing section detachably attached to said anchored casing section and movable longitudinally of the axis of the pump, said movable section carrying the pump impeller and driving shaft, and a coupling connecting the driving shaft and prime mover, said coupling constructed to permit, upon disconnection of coupling parts, movement of the movable casing section, longitudinally of the axis of the pump a distance equal to or greater than the depth of insertion of the impeller into the anchored section, and an anchoring pedestal formed upon said anchored casing section and extending beneath the movable casing section.

4. In a rotating pump, an anchored casing section including suction and discharge connections and the complete fluid channel of the pump, a movable section detachably attached to one side of the anchored section and carrying the pump impeller and driving shaft, and a shaft coupling designed to permit, upon disconnection of coupling parts, movement of the movable casing section, impeller and shaft in a straight line parallel with the axis of the pump a distance sufficient to permit the impeller to clear the anchored casing section.

FRANZ LAWACZECK.